United States Patent [19]
Chen et al.

[11] Patent Number: 5,763,071
[45] Date of Patent: Jun. 9, 1998

[54] HIGH AREAL DENSITY MAGNETIC RECORDING MEDIUM WITH DUAL MAGNETIC LAYERS

[75] Inventors: Ga-Lane Chen, Fremont; Qixu Chen, Milpitas, both of Calif.

[73] Assignee: Seagate Technology, Inc., Scotts Valley, Calif.

[21] Appl. No.: 614,848

[22] Filed: Mar. 11, 1996

[51] Int. Cl.$^6$ ............................................. G11B 5/66
[52] U.S. Cl. .................. 428/332; 428/336; 428/694 T; 428/694 TS; 428/694 TP; 428/694 TC; 428/694 TM; 428/900
[58] Field of Search ................. 428/694 T, 694 TS, 428/694 TP, 694 TC, 694 TM, 332, 336, 900

[56] References Cited

U.S. PATENT DOCUMENTS

| | | | |
|---|---|---|---|
| 3,047,423 | 7/1962 | Eggenberger et al. | 427/599 |
| 3,508,887 | 4/1970 | Chezel et al. | 428/610 |
| 4,622,273 | 11/1986 | Nakashima et al. | 428/668 |
| 4,642,270 | 2/1987 | Morita et al. | 428/621 |
| 4,798,765 | 1/1989 | Ishizaka et al. | 428/336 |
| 5,024,903 | 6/1991 | Mizukami | 428/694 TS |
| 5,344,706 | 9/1994 | Lambeth et al. | 428/336 |
| 5,432,012 | 7/1995 | Lal et al. | 428/610 |
| 5,462,796 | 10/1995 | Teng et al. | 428/336 |
| 5,536,585 | 7/1996 | Futamoto et al. | 428/611 |

FOREIGN PATENT DOCUMENTS

| | | |
|---|---|---|
| 5-109041 | 4/1993 | Japan . |
| 5-114128 | 5/1993 | Japan . |
| 6-84159 | 3/1994 | Japan . |

OTHER PUBLICATIONS

Futamoto et al., "Investigation of 2 Gb/in$^2$ Magnetic Recording at a Track Density of 17 kTPI," IEEE Transactions on Magnetics, vol. 27, No. 6, Nov. 1991, pp. 5280–5285.

Murdock et al., "Roadmap for 10 Gbit/in$^2$ Media: Challenges," IEEE Transactions on Magnetics, vol. 28, No. 5, Sep. 1992, pp. 3078–3083.

Primary Examiner—Leszek Kiliman
Attorney, Agent, or Firm—Lowe, Price, LeBlanc & Becker

[57] ABSTRACT

A magnetic recording medium having a high areal recording density of about 3 to about 20 Gb/in$^2$, an Mrt of about 0.30 to about 0.60 memu/cm$^2$, a coercivity greater than 2,500 Oersteds and a coercivity squareness of about 0.70 to about 0.95 is obtained by depositing one or more pairs of magnetic layers comprising a magnetically isotropic layer directly on a magnetically anisotropic layer. Chromium intermediate layers are employed to separate each pair of magnetically isotropic/anisotropic layers. In one embodiment, the magnetically anisotropic layer comprises a cobalt-base alloy containing chromium and tantalum and the magnetically isotropic layer comprises a cobalt-base layer containing chromium, platinum and tantalum.

32 Claims, 5 Drawing Sheets

| | |
|---|---|
| Lubricant | 38 |
| Carbon overcoat | 37 |
| CoCrPtTa (Isotropic layer) | 36 |
| CoCrTa (Anisotropic layer) | 35 |
| Cr Intermediate layer | 34 |
| CoCrPtTa (Isotropic layer) | 33 |
| CoCrTa (Anisotropic layer) | 32 |
| Cr Underlayer | 31 |
| NiP Plated AlMg | 30 |

| Lubricant | — 38 |
| Carbon overcoat | — 37 |
| CoCrPtTa (Isotropic layer) | — 36 |
| CoCrTa (Anisotropic layer) | — 35 |
| Cr Intermediate layer | — 34 |
| CoCrPtTa (Isotropic layer) | — 33 |
| CoCrTa (Anisotropic layer) | — 32 |
| Cr Underlayer | — 31 |
| NiP Plated AlMg | — 30 |

FIG. 3

| Lubricant | — 51 |
| Carbon overcoat | — 50 |
| CoCrPtTa (Isotropic layer) | — 49 |
| CoCrTa (Anisotropic layer) | — 48 |
| Cr Intermediate layer | — 47 |
| CoCrPtTa (Isotropic layer) | — 46 |
| CoCrTa (Anisotropic layer) | — 45 |
| Cr Intermediate layer | — 44 |
| CoCrPtTa (Isotropic layer) | — 43 |
| CoCrTa (Anisotropic layer) | — 42 |
| Cr Underlayer | — 41 |
| NiP Plated AlMg | — 40 |

HIGH AREAL DENSITY MAGNETIC RECORDING MEDIUM WITH DUAL MAGNETIC LAYERS

TECHNICAL FIELD

The present invention relates to the recording, storage and reading of magnetic data, particularly rotatable magnetic recording media, such as thin film magnetic disks. The invention has particular applicability to a high density magnetic recording medium which exhibits high coercivity and coercivity squareness at a relatively low Mrt.

BACKGROUND ART

Thin film magnetic recording disks and disk drives are conventionally employed for storing large amounts of data in magnetizable form. Data are written onto and read from a rapidly rotating recording disk by means of a magnetic head transducer assembly that flies closely over the surface of the disk. The escalating requirements for high areal recording density and increasingly smaller disk drives impose increasingly demanding requirements on thin film magnetic recording media in terms of coercivity, remanence coercivity squareness, low medium noise and narrow track recording performance. Considerable effort has been spent in recent years to produce magnetic recording media having higher recording densities and satisfying such demanding requirements, particularly for longitudinal recording.

Figure 1:
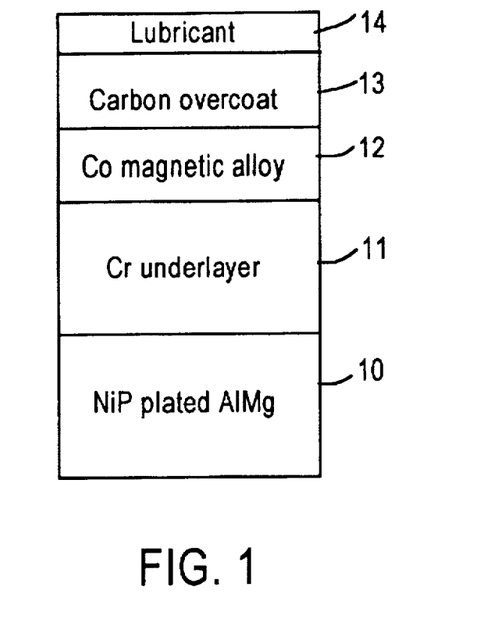
FIG. 1 schematically depicts a conventional magnetic recording medium structure.

A conventional longitudinal recording medium is depicted in FIG. 1 and comprises a substrate 10, typically an aluminum (Al)-alloy, such as an aluminum-magnesium (Al—Mg)-alloy, plated with a layer of amorphous nickel-phosphorous (NiP). Alternative substrates include glass and glass-ceramic materials and graphites. Substrate 10 typically contains sequentially deposited thereon a chromium (Cr) or Cr-alloy underlayer 11, a cobalt (Co)-base alloy magnetic layer 12, a protective carbon overcoat 13 and a lubricant topcoat 14. Cr underlayer 11, Co-base alloy magnetic layer 12 and protective carbon overcoat 13 are typically deposited by sputtering techniques. A conventional Al-alloy substrate is provided with a Nip plating, primarily to increase the hardness of the Al substrate, serving as a suitable surface for polishing to provide the requisite surface roughness or texture, which is substantially reproduced on the disk surface.

In recent years, considerable effort has been expended to achieve high areal recording density. Among the recognized significant factors affecting recording density are magnetic remanence (Mr), coercivity, coercivity squareness (S*), signal/noise ratio, and flying height, which is the distance at which a read/write head floats above the spinning disk. Prior approaches to achieve increased areal recording density for longitudinal recording involve the use of dual magnetic layers separated by a non-magnetic layer as in Teng et al., U.S. Pat. No. 5,462,796, and the use of a gradient magnetic layer interposed between two magnetic layers as in Lal et al., U.S. Pat. No. 5,432,012.

The achievement of a magnetic recording medium having an areal density of 2 giga bits (Gb)/in$^2$ on a prototype 3.5 inch diameter hard disk drive was reportedly attributed to developments in magnetic head, recording medium, positioning and signal processing technologies. Futamoto et al., "Investigation of 2 Gb/in$^2$ Magnetic Recording at a Track Density of 17 kTPI," IEEE Transactions on Magnetics, Vol. 27, No. 6, November 1991, pp. 5280–5285. The magnetic recording medium reported by Futamoto et al. comprises a glass substrate, and sequentially formed thereon a chromium underlayer, a first magnetic layer comprising cobalt, chromium, platinum and silicon, which is magnetically isotropic with lower saturation magnetization (Ms), a second magnetically isotropic cobalt layer containing chromium and platinum deposited on the first magnetic layer with higher Ms, and a carbon overcoat.

The goal of achieving a rigid disk magnetic recording medium having an areal recording density of about 10 Gb/in$^2$, however, has remained elusive. It has been reported that informed speculation with respect to advances in media technology is required to achieve the goal of 10 Gb/in$^2$ recording density. Murdock "Roadmap for 10 Gbit/in$^2$ Media: Challenges,"IEEE Transactions on Magnetics, Vol. 28, No. 5, September 1992, pp. 3078–3083. The conclusion expressed by Murdock is that revolutionary improvements will likely be required. Although several candidate media systems in existence show promise, it was concluded that much work remains before they can be practical.

Dual magnetic layer media are also disclosed by Kodama, Japanese Patent 5-114128 and Tsuboi, Japanese Patent 5-109041, wherein the magnetic layers exhibit different coercivities. Dual layer magnetic recording medium are also disclosed by Morita et al., U.S. Pat. No. 4,642,270, Chezel et al., U.S. Pat. No. 3,508,887, Eggenberger et al., U.S. Pat. No. 3,047,423 and Nakashima et al., U.S. Pat. No. 4,622,273, the latter directed to a recording medium for perpendicular magnetization.

Accordingly, there exists a need for a magnetic recording medium having an areal recording density in excess of 2 Gb/in$^2$, such as in the 10 Gb/in$^2$ range, preferably up to 20 Gb/in$^2$, exhibiting high coercivity and coercivity squareness and a relatively low Mrt (magnetic remanence×thickness), which can be employed for hard disk drives using GMR (giant magnetoresistance) heads.

DISCLOSURE OF THE INVENTION

An object of the present invention is a magnetic recording medium exhibiting a high areal recording density, high coercivity and coercivity squareness, and a low Mrt.

A further object of the present invention is a magnetic recording medium having an areal density of about 3 to about 20 Gb/in$^2$, high coercivity and coercivity squareness, and a low Mrt.

Additional objects and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising: a non-magnetic substrate; a Cr or Cr-alloy underlayer formed on the substrate; and a plurality of magnetic layers sequentially formed on the Cr or Cr-alloy underlayer; wherein, the magnetic recording medium has an areal density of about 3 to about 20 Gb/in$^2$ and exhibits an Mrt of about 0.30 to about 0.60 memu/cm$^2$.

Another aspect of the present invention is a magnetic recording medium comprising: a non-magnetic substrate; a Cr or Cr-alloy underlayer formed on the substrate; a first magnetic layer, which is magnetically anisotropic, formed on the Cr or Cr-alloy underlayer; and a second magnetic layer, which is magnetically isotropic, formed directly on the first magnetic layer; wherein, the magnetic recording medium has an areal recording density of about 3 to about 20 Gb/in$^2$ and exhibits an Mrt of about 0.30 to about 0.60 memu/cm$^2$.

A further aspect of the present invention is a magnetic recording medium comprising: a non-magnetic substrate; a Cr or Cr-alloy underlayer formed on the substrate; a first magnetic layer comprising a cobalt-base alloy containing chromium and tantalum, which is magnetically anisotropic, formed on the Cr or Cr-alloy underlayer; and a second magnetic layer comprising a cobalt-base alloy containing chromium, platinum and is tantalum, which is magnetically isotropic, formed directly on the first magnetic layer; wherein the magnetic recording medium has an areal recording density of about 3 to about 20 Gb/in$^2$ and exhibits an Mrt of about 0.30 to about 0.60 memu/cm$^2$.

A further aspect of the present invention is a magnetic recording medium comprising: a non-magnetic substrate; a Cr or Cr-alloy underlayer formed on the substrate; a first magnetic layer, which is magnetically anisotropic, formed on the Cr or Cr-alloy underlayer; a second magnetic layer, which is magnetically isotropic, formed directly on the first magnetic layer; a first chromium or chromium-alloy intermediate layer formed on the second magnetic layer; a third magnetic layer, which is magnetically anisotropic, formed on the first intermediate layer; and a fourth magnetic layer, which is magnetically isotropic, formed directly on the third magnetic layer; wherein the magnetic recording medium has an areal recording density of about 3 to about 20 Gb/in$^2$ and exhibits an Mrt of about 0.30 to about 0.60 memu/cm$^2$.

Another aspect of the present invention is a magnetic recording medium comprising: a non-magnetic substrate; a Cr or Cr-alloy underlayer formed on the substrate; a first magnetic layer, which is magnetically anisotropic, formed on the Cr or Cr-alloy underlayer; a second magnetic layer, which is magnetically isotropic, formed directly on the first magnetic layer; a first chromium or chromium-alloy intermediate layer formed on the second magnetic layer; a third magnetic layer, which is magnetically anisotropic, formed on the first intermediate layer; a fourth magnetic layer, which is magnetically isotropic, formed directly on the third magnetic layer; a second chromium or chromium-alloy interlayer formed on the fourth magnetic layer; a fifth magnetic layer, which is magnetically anisotropic, formed on the second intermediate layer; and a sixth magnetic layer, which is magnetically isotropic, formed directly on the fifth magnetic layer; wherein the magnetic recording medium has an areal recording density of about 3 to about 20 Gb/in$^2$ and exhibits an Mrt of about 0.30 to about 0.60 memu/cm$^2$.

Additional objects and advantages of the present invention will become readily apparent to those skilled in this art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION FOR THE INVENTION

The present invention provides a magnetic recording medium having a high areal recording density, for longitudinal recording, in the range of about 3 Gb/in$^2$ to about 20 Gb/in$^2$, having a high coercivity and S*, at a relatively low Mrt. Such high areal recording density in conjunction with desirable magnetic properties is achieved by the strategic use of dual magnetic layers.

In accordance with the present invention, a magnetic recording medium is formed comprising at least one pair of sequentially formed magnetic layers. In one embodiment, a Cr or Cr-alloy underlayer is deposited on a non-magnetic substrate, a first magnetic layer, which is magnetically anisotropic, is deposited on the Cr or Cr-alloy underlayer, and a second magnetic layer, which is magnetically isotropic, is formed directly on the first magnetic layer. Each magnetic layer of the magnetic recording medium of the present invention can typically be deposited at a thickness of about 5Å to about 200Å and, together, the first and second magnetic layers constituting a first pair of magnetic layers exhibit a substantially single coercivity. Advantageously, the magnetic recording medium in accordance with the present invention exhibits an Mrt of about 0.30 to about 0.60 memu/cm$^2$, such as about 0.40 to about 0.50 memu/cm$^2$ for an areal recording density of about 5 to about 10 Gb/in$^2$. The present invention easily provides a magnetic recording medium having an areal recording density of about 10 Gb/in$^2$, an Mrt of about 0.40 memu/cm$^2$, a coercivity in excess of about 3,000 Oersteds, and an S* of about 0.70 to about 0.95.

The reason underlying the achievement of a high areal recording density, high coercivity and S*, and low Mrt, by virtue of employing dual magnetic layers in accordance with the present invention is not known. It is believed, however, that such a high areal recording density and advantageous magnetic properties are attributed to employing a pair of magnetic alloy layers comprising a magnetically isotropic layer deposited directly on a magnetically anisotropic layer, wherein the pair of magnetic layers, together exhibit a substantially coercivity. A state of magnetic anisotropy is considered to exist when the orientation ratio, i.e., ratio of the circumferential coercivity to radial coercivity, is greater than 1. A state of magnetic isotropy is considered to exist when the orientation ratio is about 1.

The magnetic layers of the present invention can be formed of conventional magnetic materials, such as Co-base alloys. In an embodiment of the present invention, the first magnetic layer, which exhibits magnetic anisotropy, comprises cobalt, or an alloy of cobalt, chromium and tantalum (CoCrTa) . The second magnetic layer, which exhibits magnetic isotropy, comprises a cobalt-base alloy layer, such as cobalt-chromium-platinum alloy (CoCrPt) or a cobalt-chromium-platinum-tantalum alloy (CoCrPtTa).

According to present invention, an underlayer is provided between the substrate and the first magnetic layer. The underlayer can comprise Cr or a Cr-alloy such as chromium-vanadium (CrV), or chromium-titanium (CrTi), oxygen-doped chromium ($CrO_x$), tungsten (W) or a W-alloy. Any of various substrates conventionally employed in producing magnetic recording media can be employed in the magnetic recording media of the present invention. Such conventional substrates include NiP-plated Al-alloys, glass, glass-ceramic materials and carbon substrates, e.g., electrically conductive graphite. Glass-ceramic materials are typically formed by heat treating the surface to form a thin crystallized layer of ceramic thereon. Electrically conductive graphites are desirable for higher coercivities. In an embodiment of the present invention, a NiP-plated Al—Mg alloy is utilized as the substrate.

The magnetic recording medium of the present invention typically comprises a carbon overcoat on the magnetic layers, and a lubricant topcoat on the carbon overcoat. The Cr or Cr-alloy underlayer, magnetic layers, and carbon overcoat can be applied in a conventional manner, as by any of various sputtering techniques employed in the production of magnetic recording media.

In a conventional magnetic recording medium, such as that depicted in FIG. 1, the coercivity typically reaches a maximum in the vicinity of an Mrt of 0.8 to 1.1 memu/cm². As the Mrt decreases from the coercivity maximum, coercivity and S* decrease sharply and are simply not high enough for magnetic recording with an areal recording density in excess of 3 Gb/in². In accordance with the present invention, a magnetic recording medium with an areal recording density of about 3 to about 20 Gb/in² is achieved having high coercivity and S* at a relatively low Mrt of about 0.30 to about 0.60 memu/cm², such as about 0.40 to about 0.50 memu/cm² for an areal density of about 5 to about 10 Gb/in²

In order to achieve high areal density, it is necessary to provide a magnetic recording medium exhibiting a low Mrt. In accordance with the present invention, a magnetic recording medium exhibiting a relatively low Mrt with high coercivity is provided, thereby enabling areal densities from 3 to 20 Gb/in² as shown in Table 1 below.

TABLE 1

| Areal Density (Gb/in²) | 3 | 5 | 10 | 20 |
|---|---|---|---|---|
| Mrt (memu/cm²) | 0.6 | 0.5 | 0.4 | 0.3 |

Figure 2:
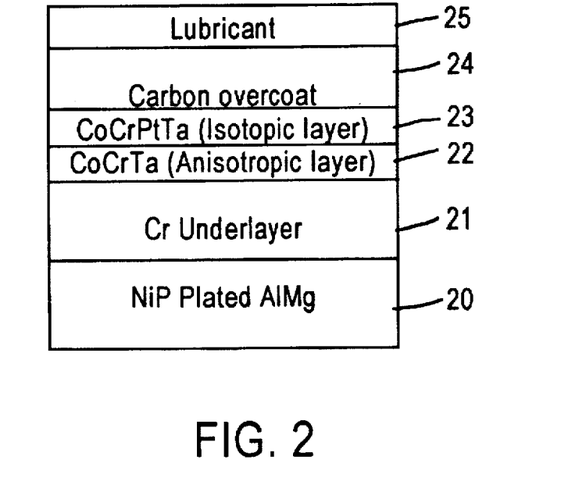
FIG. 2 schematically depicts a magnetic recording medium in accordance with an embodiment of the present invention.

A magnetic recording medium in accordance with one embodiment of the present invention is depicted in FIG. 2 and comprises substrate 20, such as NiP-plated Al—Mg, an underlayer 21, such as Cr or a Cr-alloy underlayer, having a suitable thickness, such as about 100Å to about 2000Å. A pair of magnetic layers is provided on underlayer 21 and comprises a first magnetic layer 22, which is magnetically anisotropic, such as a CoCrTa alloy, and a second magnetic layer 23, which is magnetically isotropic, such as a CoCrPtTa alloy, deposited directly on first magnetic layer 22. A carbon overcoat 24 and a lubricant topcoat 25 are sequentially deposited on the second magnetic layer 23. The carbon overcoat is deposited at a suitable thickness, such as about 75Å to about 200Å. The lubricant topcoat is deposited at a suitable thickness, such as about 1Å to about 30Å. Magnetic layers 22 and 23 each have a thickness of about 5Å to about 200Å. The pair of magnetic layers 22 and 23, together, exhibits a substantially single coercivity.

Figure 3:
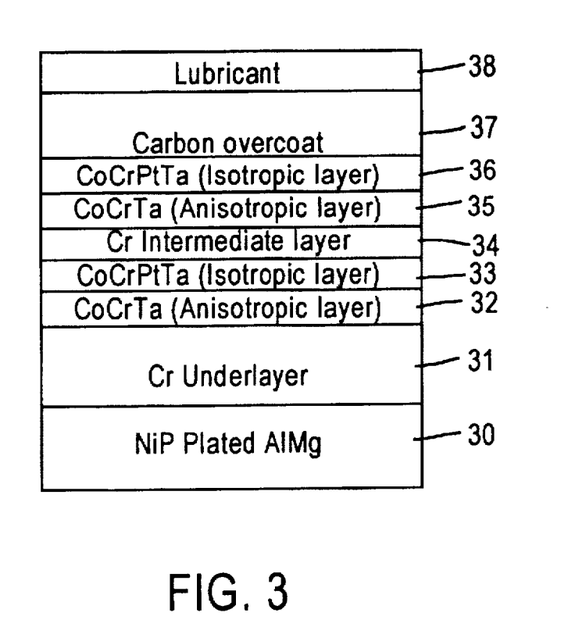
FIG. 3 schematically depicts a magnetic recording medium in accordance with another embodiment of the present invention.

In another embodiment of the present invention, a second pair of magnetic layers is deposited over the first pair of magnetic layers with a Cr or Cr-alloy intermediate layer therebetween. Each pair of magnetic layers comprises a magnetically isotropic layer deposited directly on a magnetically anisotropic layer. One such an embodiment is schematically depicted in FIG. 3 and comprises substrate 30, typically NiP-plated Al—Mg, underlayer 31, such as a Cr or Cr-alloy, first magnetic layer 32, which is magnetically anisotropic, such as CoCrTa, formed on underlayer 31, and second magnetic layer 33, which is magnetically isotropic, such as CoCrPtTa, formed directly on first magnetic layer 32. In accordance with the FIG. 3 embodiment, an intermediate layer 34, such as Cr or a Cr alloy layer, is formed on the first pair of dual magnetic layers 32 and 33. The thickness of the Cr intermediate layer 34 can range from about 5Å to about 100Å. A second pair of magnetic layers is then formed on intermediate layer 34 and comprises third magnetic layer 35, which is magnetically anisotropic, such as a CoCrTa alloy, and a fourth magnetic layer 36, which is magnetically isotropic, such as CoCrPtTa, formed directly on third magnetic layer 35. As in the FIG. 2 embodiment, a carbon overcoat 37 and lubricant topcoat 38 are provided sequentially over the magnetic layers.

Each magnetic layer 32, 33, 35 and 36, of the FIG. 3 embodiment can have a thickness of about 5Å to about 200Å. First magnetic layer 32 and second magnetic layer 33 together exhibit a substantially single coercivity, and third magnetic layer 35 and fourth magnetic layer 36 together also exhibit a substantially single coercivity. The thickness of underlayer 31, carbon overcoat 37 and lubricant topcoat 38 can be the same as the thickness of the corresponding layer in the FIG. 2 embodiment.

In the embodiment comprising two pairs of magnetic layers, as depicted in FIG. 3, Cr interlayer 34 tends to reduce media noise and S*. However, the second pair of magnetic layers, 35 and 36, tends to increase coercivity and S*. If S* is too low, the read-back signal and overwrite performance will suffer. If S* is too high, media noise increases. By providing intermediate layer 34 and the second pair of magnetic layers 35 and 36, media performance is optimized.

Figure 4:
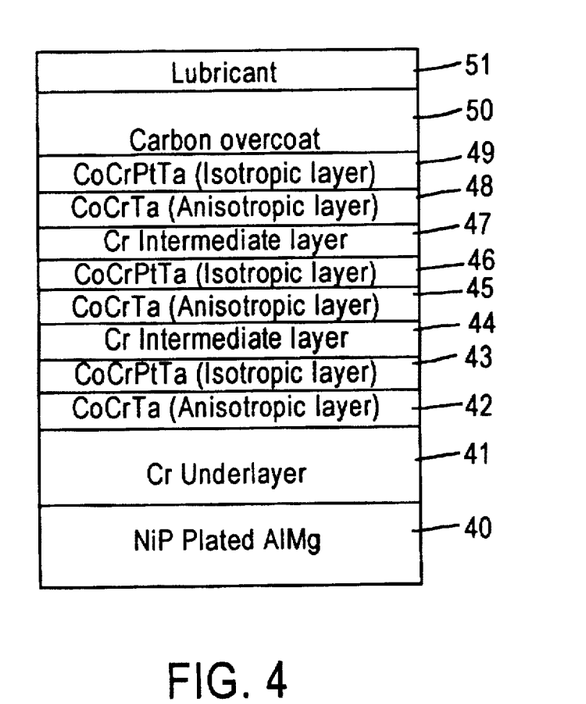
FIG. 4 schematically depicts a magnetic recording medium in accordance with yet another embodiment of the present invention.

In another embodiment of the present invention, three pairs of magnetic layers are provided with intermediate layers deposited therebetween. Such an embodiment is schematically depicted in FIG. 4 and comprises substrate 40, typically NiP-plated Al—Mg, and underlayer 41, typically Cr or a Cr-alloy. The first pair of magnetic layer comprises first magnetic layer 42, which is magnetically anisotropic, such as CoCrTa, and second magnetic layer 43, which is magnetically isotropic, such CoCrPtTa, deposited directly on first magnetic layer 42. A first intermediate layer 44, such as Cr or a Cr-alloy, is provided on second magnetic layer 43. A second pair of magnetic layers is then sequentially deposited comprising third magnetic layer 45, which is magnetically anisotropic, such as CoCrTa, and fourth magnetic layer 46, which is magnetically isotropic, such as CoCrPtTa, deposited directly on third magnetic layer 45. A second intermediate layer 47, such as Cr or Cr-base alloy, is deposited on fourth magnetic layer 46. A third pair of magnetic layers is then deposited and comprises fifth magnetic layer 48, which is magnetically anisotropic, such as CoCrTa, and sixth magnetic layer 49, which is magnetically isotropic, such as CoCrPtTa, deposited directly on the fifth magnetic layer 48. As in the FIG. 2 and FIG. 3 embodiments, a carbon overcoat 50 and lubricant topcoat 51 can be applied.

The thickness of each magnetic layer, 42, 43, 45, 46, 48 and 49, can range from about 5Å to about 200Å. First magnetic layer 42 and second magnetic layer 43, together exhibit a substantially single coercivity; third magnetic layer 45 and fourth magnetic layer 46, together, also exhibit a substantially single coercivity; and fifth magnetic layer 48 and sixth magnetic layer 49 also exhibit a substantially single coercivity. The thickness of each intermediate layer 44 and 47 can range from about 5Å to about 100Å. The thickness of underlayer 41, carbon overcoat 50 and lubricant topcoat 51 can be the same as the thickness of the corresponding layer in the FIG. 2 embodiment.

Figure 5:
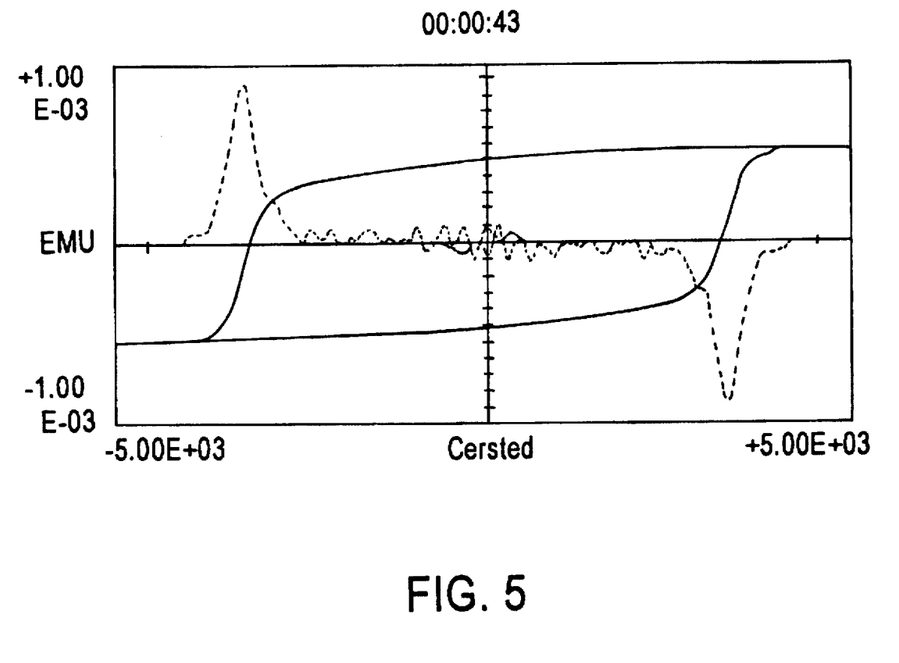
FIG. 5 represents a superimposed hysteresis curve and switching field distribution (SFD) of dual magnetic layers in accordance with the present invention.

The dual layer structure of the present invention is believed to enable the obtainment of an areal recording density of about 3 to about 20 Gb/in$^2$. Each pair of magnetic layers comprises a magnetically isotropic layer deposited directly on a magnetically anisotropic layer, each having a suitable thickness, such as about 5Å to about 200Å, so that each pair of magnetic layers exhibits a substantially single coercivity. As shown in FIG. 5, the dual layer structure of the present invention exhibits a substantially single coercivity as shown by the superimposed hysteresis curve and SFD as measured on a vibrating sample magnetometer (VSM).

EXAMPLE

Figure 6:
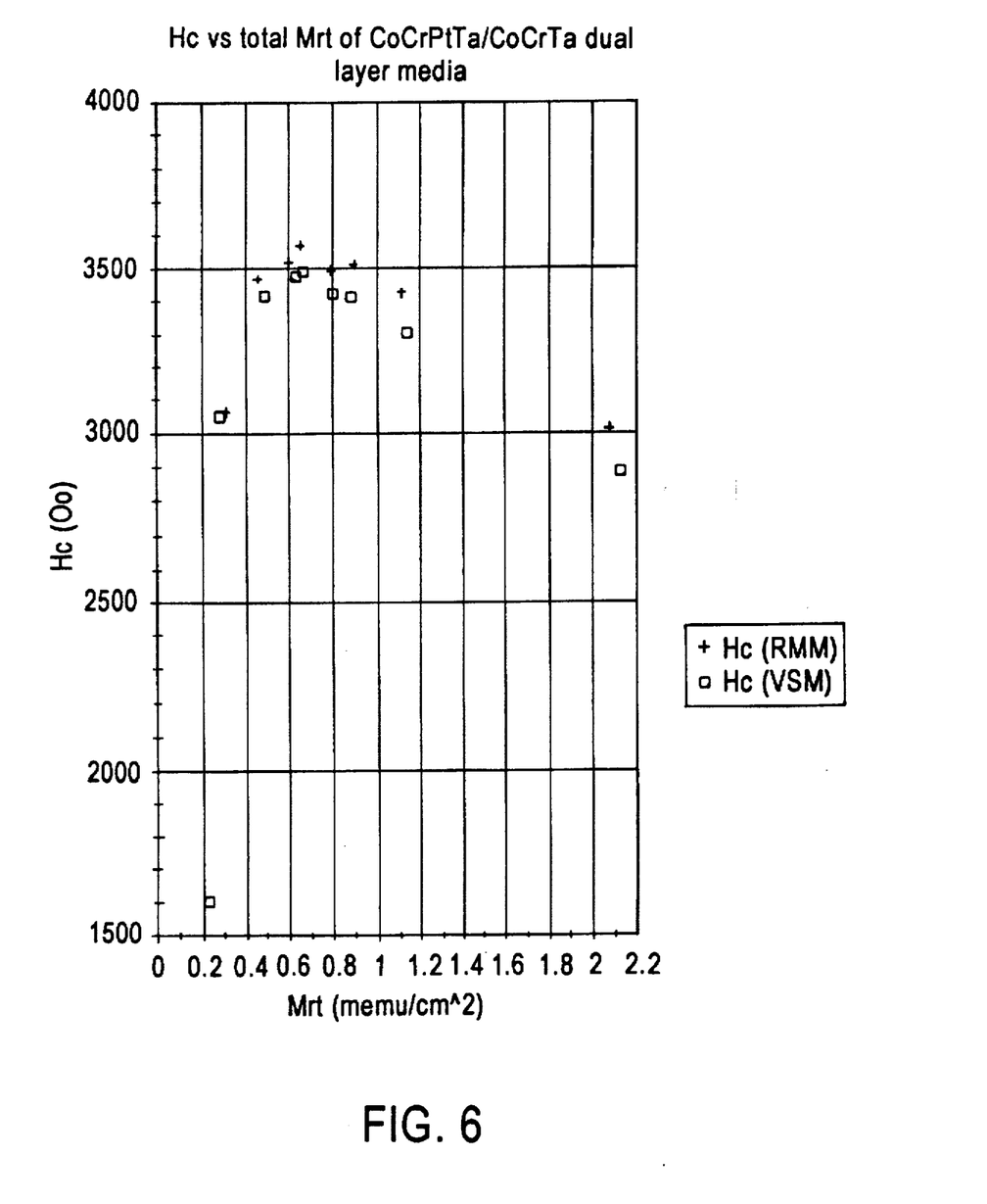
FIG. 6 is a graph showing the coercivity dependence of a dual layer magnetic recording medium of the present invention on the total Mrt of the magnetic layers.

A magnetic recording medium corresponding to the embodiment depicted in FIG. 2 was prepared having a first magnetic layer of CoCrTa and a second magnetic layer of CoCrPtTa deposited directly thereon. The substrate comprised a textured NiP-plated Al—Mg. A Cr underlayer was deposited on the textured substrate. The graph depicted in FIG. 6 shows the coercivity dependence on the total Mrt of the first and second magnetic layers measured with a VSM and a remanent moment magnetometer (RMM) along the circumferential direction of the disk. It should be apparent that the coercivity of the dual layer medium is at least 3,000 Oersteds in a range of 0.3 to 0.6 memu/cm$^2$.

Figure 7:
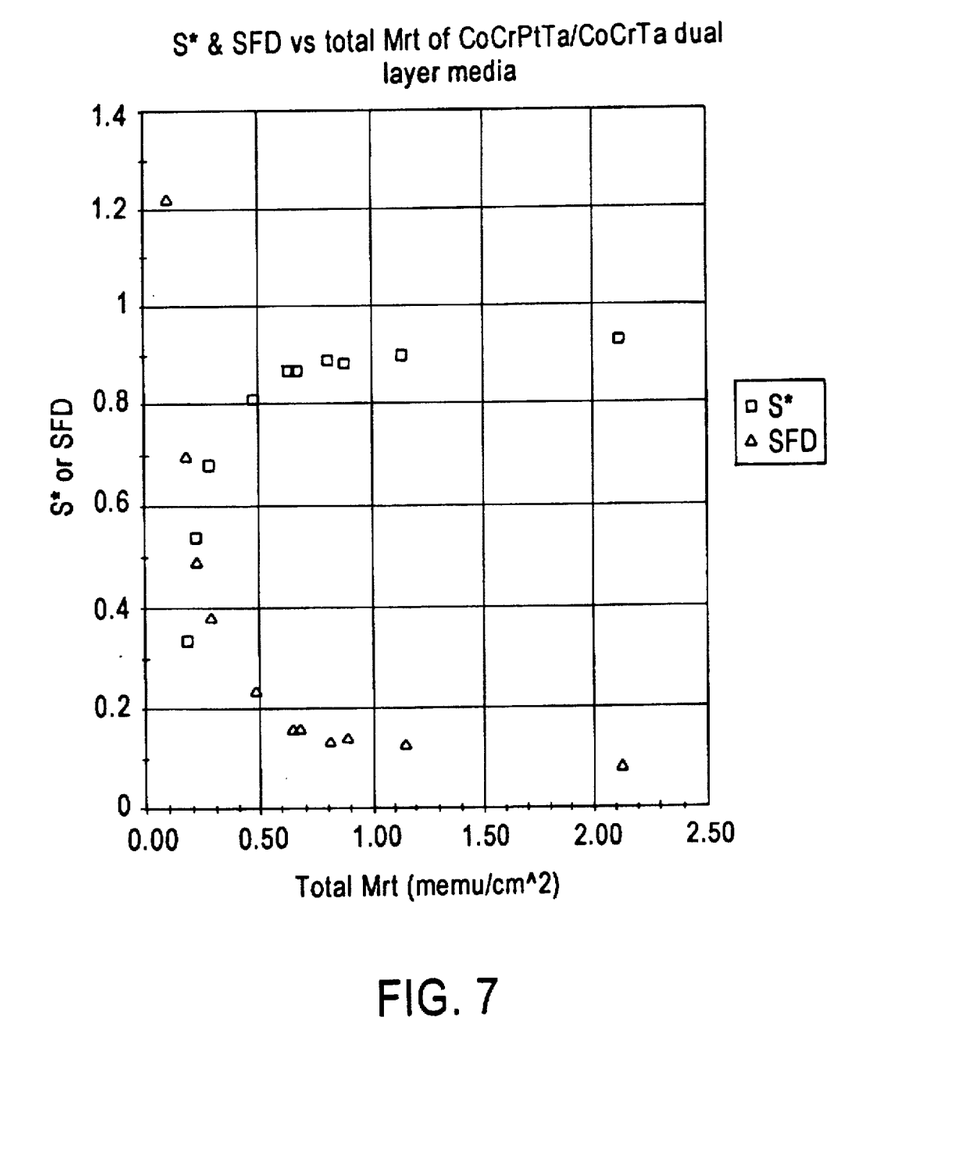
FIG. 7 is a graph showing the dependence of S* and the SFD of the dual magnetic layer medium of the FIG. 2 embodiment on the total Mrt.

The graph in FIG. 7 shows the dependence of S* and the SFD of the dual layer magnetic recording medium embodiment of the present invention depicted in FIG. 2 on the total Mrt, measured with a VSM along the circumferential direction of the disk. It is apparent that S* is suitably high even at an Mrt of 0.3 memu/cm$^2$.

Thus, in accordance with the present invention, a magnetic recording medium is provided having an areal recording density of about 3 to about 20 Gb/in$^2$, high coercivity of at least 2,500 Oersteds, typically above 3,000 Oersteds, and high S*, typically about 0.70 to 0.95. Magnetic recording media in accordance with the present invention can be advantageously employed for hard disk drives using GMR heads. The magnetic recording media of the present invention are not limited to any particular substrate material, underlayer, interlayer, protective overcoat or lubricant layer, or to any particular magnetic alloy.

Only certain embodiments of the invention and but a few examples of its versatility are shown and described in the present invention. It is to be understood that the invention is capable of use in various other combinations and environments and is capable of changes or modifications within the scope of the inventive concept as expressed herein.

We claim:

1. A magnetic recording medium comprising:

a non-magnetic substrate;

a chromium or chromium-alloy underlayer formed on the substrate; and at least one pair of magnetic layers sequentially formed on the chromium or chromium-alloy underlayer; wherein, the magnetic recording medium has an areal recording density of about 3 to about 20 Gb/in$^2$ and exhibits an Mrt of about 0.30 to about 0.60 memu/cm$^2$, and the pair of magnetic layers comprises a magnetically isotropic layer formed on a magnetically anisotropic layer.

2. The magnetic recording medium according to claim 1, which has an areal recording density of about 3 to about 10 Gb/in$^2$ and exhibits an Mrt of about 0.40 to about 0.60 memu/cm$^2$.

3. The magnetic recording medium according to claim 2, which has an areal recording density of about 5 to about 10 Gb/in$^2$ and exhibits an Mrt of about 0.40 to about 0.50 memu/cm$^2$.

4. The magnetic recording medium according to claim 1, suitable for longitudinal recording.

5. The magnetic recording medium according to claim 1, wherein the first and second magnetic layers together exhibit a substantially single coercivity.

6. The magnetic recording medium according to claim 5, wherein the first and second magnetic layers each have a thickness of about 5Å to about 200Å.

7. The magnetic recording medium according to claim 5, wherein each of the first and second magnetic layers comprises cobalt.

8. The magnetic recording medium according to claim 7, wherein the first magnetic layer consists essentially of cobalt.

9. The magnetic recording medium according to claim 7, wherein the first magnetic layer comprises a cobalt-base alloy containing chromium and tantalum.

10. The magnetic recording medium according to claim 9, wherein the second magnetic layer comprises a cobalt-base alloy containing chromium and platinum.

11. The magnetic recording medium according to claim 9, wherein the second magnetic layer comprises a cobalt-base alloy containing chromium, platinum and tantalum.

12. The magnetic recording medium according to claim 1, wherein the substrate comprises nickel-phosphorous plated aluminum, a nickel-phosphorous plated aluminum-base alloy, a glass or a glass ceramic material.

13. The magnetic recording medium according to claim 12, further comprising a carbon overcoat on the second magnetic layer and a lubricant topcoat on the carbon overcoat.

14. The magnetic recording medium according to claim 1, which exhibits a coercivity in excess of about 2,500 Oersteds and a coercivity squareness of about 0.70 to about 0.95.

15. The magnetic recording medium according to claim 14, which exhibits a coercivity of about 3,000 to about 3,500 Oersteds.

16. The magnetic recording medium according to claim 1, further comprising:

a first chromium or chromium-alloy intermediate layer on the second magnetic layer;

a third magnetic layer, which is magnetically anisotropic, formed on the first intermediate layer; and a fourth magnetic layer, which is magnetically isotropic, formed directly on the third magnetic layer.

17. The magnetic recording medium according to claim 16, further comprising:

a chromium underlayer formed on the non-magnetic substrate;

a carbon overcoat formed on the fourth magnetic layer; and a lubricant topcoat formed on the carbon overcoat.

18. The magnetic recording medium according to claim 16, wherein: the first and second magnetic layers together exhibit a substantially single coercivity; and the third and fourth magnetic layers together exhibit a substantially single coercivity.

19. The magnetic recording medium according to claim 18, wherein the first, second, third and fourth magnetic layers each have a thickness of about 5Å to about 200Å.

20. The magnetic recording medium according to claim 11, further comprising:

a first chromium or chromium-alloy intermediate layer formed on the second magnetic layer;

a third magnetic layer comprising a cobalt-base alloy containing chromium and tantalum, which is magnetically anisotropic, formed on the first intermediate layer; and a fourth magnetic layer comprising a cobalt-base alloy containing chromium, platinum and tantalum, which is magnetically isotropic, formed directly on the third magnetic layer.

21. The magnetic recording medium according to claim 20, further comprising a chromium or chromium alloy underlayer formed between the non-magnetic substrate and the first magnetic layer, a carbon overcoat formed on the fourth magnetic layer, and a lubricant topcoat formed on the carbon overcoat.

22. The magnetic recording medium according to claim 16, further comprising:

a second chromium or chromium-alloy intermediate layer formed on the fourth magnetic layer;

a fifth magnetic layer, which is magnetically anisotropic, formed on the second intermediate layer; and a sixth magnetic layer, which is magnetically isotropic, formed directly on the fifth magnetic layer.

23. The magnetic recording medium according to claim 22, further comprising a chromium or chromium alloy underlayer formed between the non-magnetic substrate and first magnetic layer, a carbon overcoat formed on the sixth magnetic layer and a lubricant topcoat formed on the carbon overcoat.

24. The magnetic recording medium according to claim 22, wherein:

the first and second magnetic layers together exhibit a substantially single coercivity;

the third and fourth magnetic layers together exhibit a substantially single coercivity; and the fifth and sixth magnetic layers together exhibit a substantially single coercivity.

25. The magnetic recording medium according to claim 24, wherein the first, second, third, fourth, fifth and sixth magnetic layers each have a thickness of about 5Å to about 200Å.

26. The magnetic recording medium according to claim 20, further comprising:

a second chromium or chromium alloy intermediate layer formed on the fourth magnetic layer;

a fifth magnetic layer comprising a cobalt-base alloy containing chromium and tantalum, which is magnetically anisotropic, formed on the second intermediate layer; and a sixth magnetic layer comprising a cobalt-base alloy containing chromium, platinum and tantalum, which is magnetically isotropic, formed directly on the fifth magnetic layer.

27. The magnetic recording medium according to claim 26, further comprising a chromium or chromium alloy underlayer formed between the non-magnetic substrate and the first magnetic layer, a carbon overcoat formed on the sixth magnetic layer, and a lubricant topcoat formed on the carbon overcoat.

28. The magnetic recording medium according to claim 20, wherein the first intermediate layer has a thickness of about 5Å to about 100Å.

29. The magnetic recording medium according to claim 22, wherein each of the first and second intermediate layers has a thickness of about 5Å to about 100Å.

30. A disk drive system comprising a giant magnetorestrictive recording head and the magnetic recording medium according to claim 1.

31. A magnetic recording medium comprising:

a non-magnetic substrate;

an underlayer formed on the substrate; and at least one pair of magnetic layers sequentially formed on the underlayer; wherein, the magnetic recording medium has an areal recording density of about 3 to about 20 Gb/in$^2$ and exhibits an Mrt of about 0.30 to about 0.60 memu/cm$^2$, and the pair of magnetic layers comprises a magnetically isotropic layer formed on a magnetically anisotropic layer.

32. The magnetic recording medium according to claim 31, wherein the underlayer comprises chromium, a chromium-alloy, oxygen-doped chromium, tungsten or a tungsten-alloy.

* * * * *